United States Patent [19]
Chandler et al.

[11] Patent Number: 6,122,561
[45] Date of Patent: *Sep. 19, 2000

[54] PRECISION CONTINUOUS SURFACE GUIDED OPTICAL MODULE CARRIER AND METHOD OF USING SAME

[75] Inventors: William Keith Chandler, Woodsboro; Andrei Csipkes, Savage; Thomas Robert Boyer, Odenton; Charles Austin Benner, Glen Burnie, all of Md.

[73] Assignee: CIENA Corporation, Linthicum, Md.

[*] Notice: This patent issued on a continued prosecution application filed under 37 CFR 1.53(d), and is subject to the twenty year patent term provisions of 35 U.S.C. 154(a)(2).

[21] Appl. No.: 09/144,434

[22] Filed: Sep. 1, 1998

[51] Int. Cl.[7] ............................ G06F 19/00; B65G 21/00; B60T 7/16; G01C 22/00
[52] U.S. Cl. ...................... 700/115; 198/861.1; 180/169; 701/23
[58] Field of Search .................. 364/478.16; 198/867.11; 180/168, 169; 701/23; 359/319, 393, 392, 394, 368; 700/115

[56] References Cited

U.S. PATENT DOCUMENTS

| | | | |
|---|---|---|---|
| 4,367,915 | 1/1983 | Georges | 359/393 |
| 4,773,018 | 9/1988 | Lundstrom | 180/168 |
| 5,374,879 | 12/1994 | Pin et al. | 701/23 |
| 5,814,829 | 9/1998 | Broude et al. | 250/559.46 |

*Primary Examiner*—Jon Henry
*Attorney, Agent, or Firm*—Daniel N. Daisak; David L. Soltz

[57] ABSTRACT

An optical module inspection circuit on an optical platform includes an optical module carrier for precisely aligning optical devices with optical interfaces of inspection equipment located at fixed positions in the optical module inspection circuit. The module includes an apparatus for conveyance along a top surface of the optical platform. The module may be conveyed automatically to predetermined positions on the optical platform to automate alignment and positioning of optical devices with respect to optical inspection stations in the optical test circuit.

6 Claims, 7 Drawing Sheets

PRECISION CONTINUOUS SURFACE GUIDED OPTICAL MODULE CARRIER AND METHOD OF USING SAME

BACKGROUND OF THE INVENTION

1) Field of the Invention

This invention pertains to the field of optical device testing and in particular to an apparatus and method for facilitating inspection of the surfaces of optical devices on an optical module.

2) Background of the Related Art

Optical devices combined with electronics are increasingly being used in communication and information systems. It is important to inspect the surfaces of the optical devices after final assembly onto on optical module to insure that the module will perform as expected.

Inspection of the optical device surfaces is typically performed at one or more optical inspection stations in an test circuit on an optical bench or platform. An inspection station may typically include a microscope or an electronic imaging device or camera for inspecting the optical device (s). Each optical device surface is manually aligned with an optical device interface at one or more inspection stations and then inspected. A connector may be provided between an optical device interface of the inspection station and an optical device to be inspected.

Unfortunately, manual alignment is labor-intensive and somewhat difficult. A microscope or optical camera is typically heavy, rigid and fixed with little or no alignment flexibility. Likewise, the optical module is often heavy and rigid. Also, the degree of precision required for optical alignment precludes the use of flexible connectors between the microscope and the optical device.

Often during the alignment process, one or more optical device surfaces inadvertently strike against the platform or inspection apparatus, damaging the optical surface. This can necessitate costly repairs or even cause the module to be wasted.

For example an optical module can cost $50,000 or more, and it is not uncommon for repairs caused by damage to an optical device during inspection to amount to $10,000.

Accordingly, it would be advantageous to provide an apparatus and method for easily bringing optical device surfaces reliably into alignment with inspection stations. It would also be advantageous to provide an apparatus and method which provides an extra degree of freedom of movement when aligning an optical inspection station with an optical device on an optical module. It would further be advantageous to provide an automated apparatus and method which reduces the amount of labor involved in the process. Other and further objects and advantages will appear hereinafter.

SUMMARY OF THE INVENTION

The present invention comprises an apparatus and method for facilitating inspection of the surfaces of optical devices on an optical module.

In one aspect of the invention, an optical module carrier is provided which includes means for conveying an optical module to one or more optical inspection stations in an optical test circuit. The carrier aligns optical devices on the module with each corresponding optical device interface for the optical inspection stations.

In another aspect of the invention, an optical module inspection circuit automates the alignment and positioning of optical devices with respect to optical inspection stations. Each inspection station is located at a predetermined position on an optical platform. An optical module is automatically conveyed to position an optical device to be inspected at the corresponding optical inspection station on the optical platform.

DESCRIPTION OF THE PREFERRED EMBODIMENTS

Figure 1:
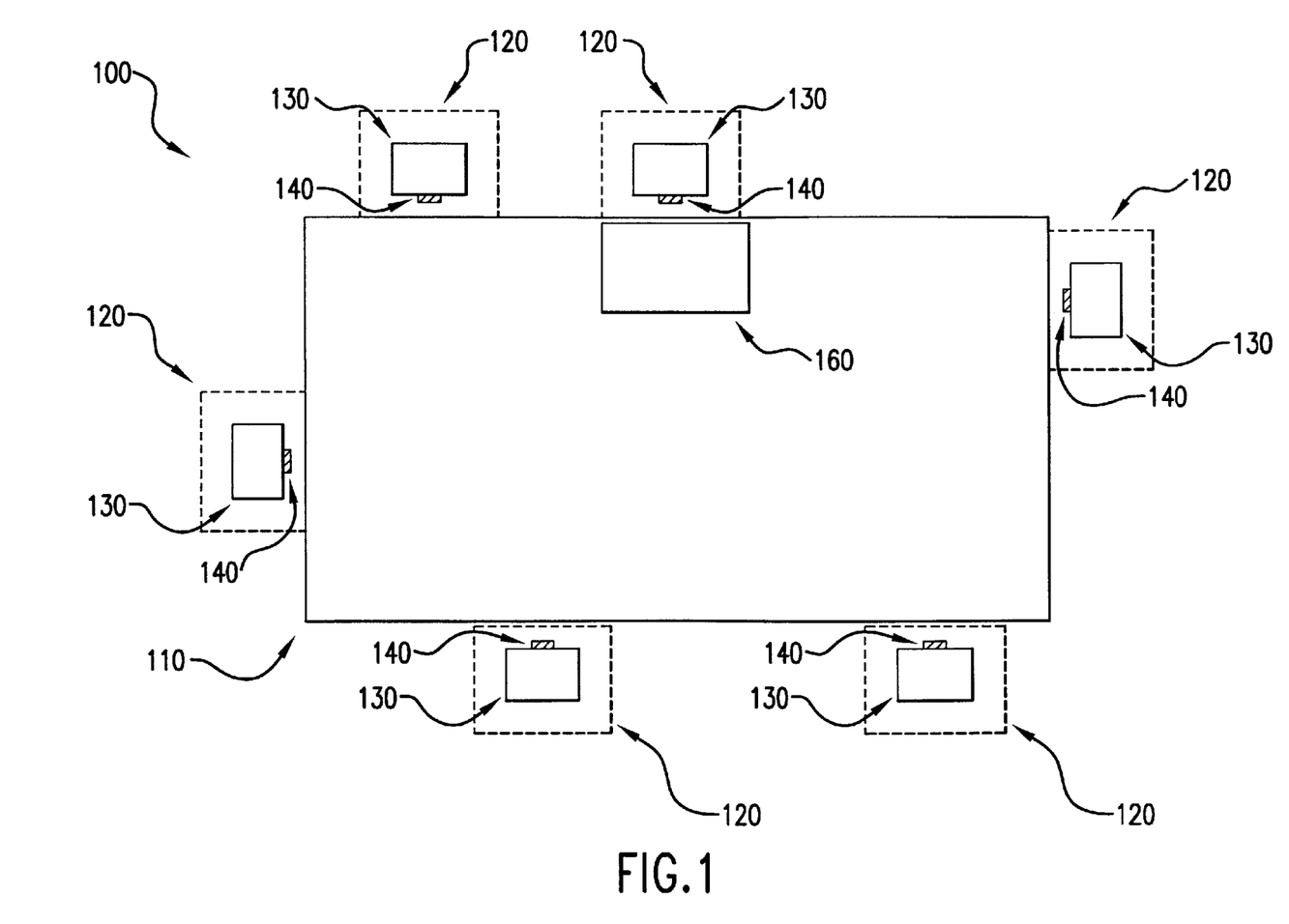
FIG. 1 shows a first embodiment of an optical module inspection circuit.

FIG. 1 shows a preferred embodiment of an optical module inspection circuit 100. The optical module inspection circuit 100 includes an optical platform 110 upon which are arranged one or more optical inspection stations 120 at fixed positions. Each optical inspection station 120 may be mounted in a fixed position on the optical platform 110.

In a preferred embodiment, the optical module platform 110 has a low-friction or virtually frictionless top surface. The optical module platform 110 top surface may be coated with a silicone based coating or TEFLON®. Also, the top surface may be made more frictionless by providing an air cushion.

Each optical inspection station 120 includes an optical inspection apparatus 130 having an optical interface 140 located a fixed distance above the top of the optical platform 110. The optical inspection apparatus 130 may be, for example, a microscope or an electronic imaging device or camera. An inspector may use the optical inspection apparatus to inspect an edge or planar surface of an optical device.

To inspect each optical device mounted on an optical module, the optical device must be aligned with the optical interface 140 of the corresponding optical inspection station 120. In a preferred embodiment, an optical module is mounted on an optical module carrier 160 which conveys the optical module to each optical inspection station 120 in the optical module inspection circuit 100. The optical module carrier 160 is designed to place each optical device on the optical module the same distance above the top surface of the optical platform 110 as the optical interface 140 of the corresponding optical inspection station 120. This insures that the optical device is properly aligned with the optical inspection apparatus to prevent damage to the optical device.

Figure 2:
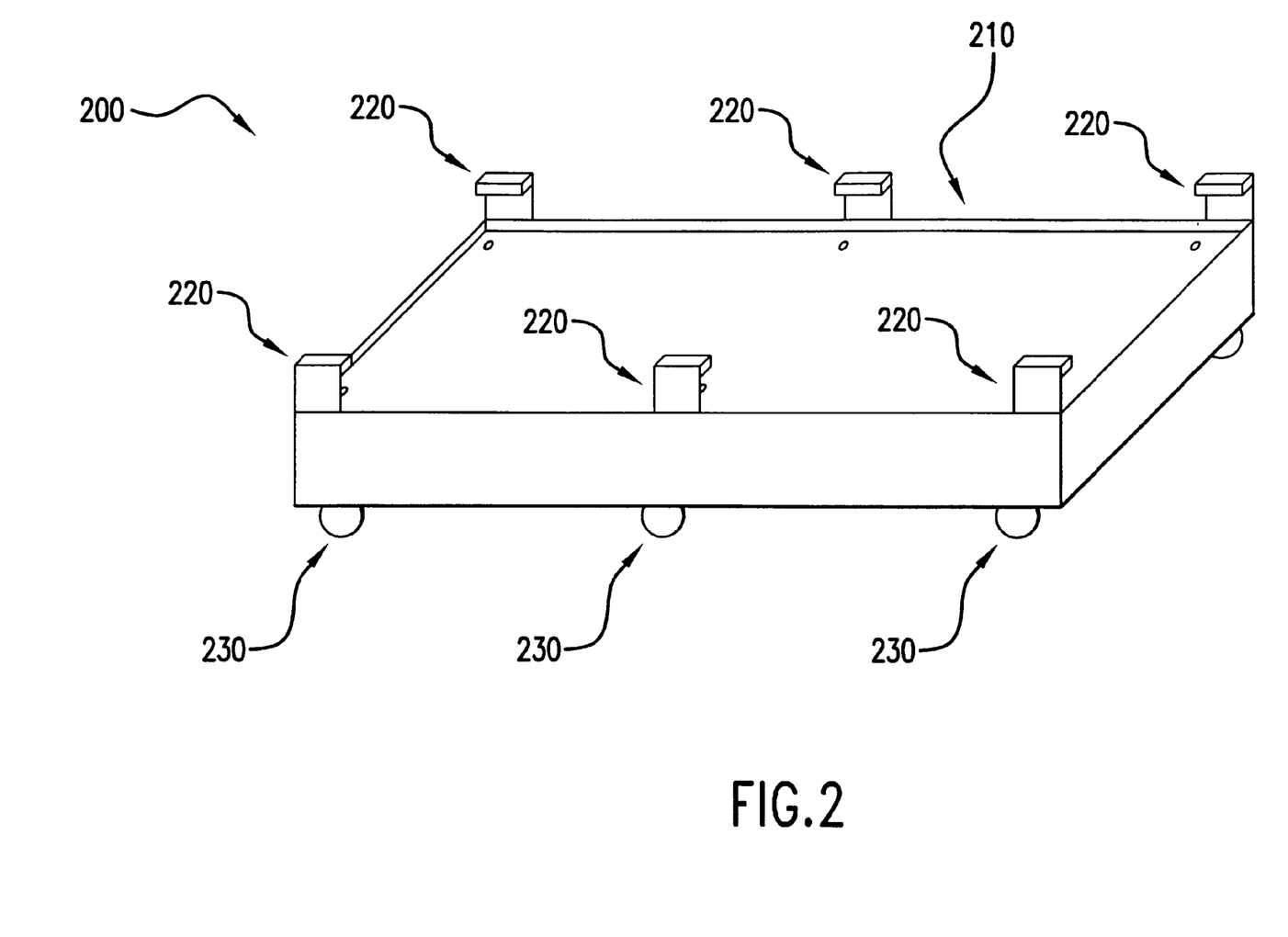
FIG. 2 shows an embodiment of an optical module carrier.

A preferred embodiment of an optical module carrier 200 according to one or more aspects of the present invention is shown in FIG. 2.

In the preferred embodiment of FIG. 2, the optical module carrier 200 includes a tray 210 upon which an optical module may be mounted. The tray preferably has a flat top surface, or it may have a raised edge or lip along its outer top surface for helping to align or maintain the optical module in a fixed position with respect to the carrier.

In a preferred embodiment, the optical module carrier 200 also includes one or more vertically extending pillars 220 for securing the optical module into a fixed position on the top surface of the tray 210. The pillars 220 may be clamps which hold an optical module to the tray. Alternatively, the pillars 210 may include one or more slots for sliding an optical module into and thereby securing the optical module on the optical module carrier 200.

Optionally, the optical module and the optical module carrier may each include threaded holes which are aligned with corresponding holes in an optical module when the optical module is properly placed on the top surface of the optical module carrier 200. In that case, the optical module may be secured to the optical module carrier 200 by means of one or more screws or bolts.

In a preferred embodiment, the optical module carrier 200 includes one or more rollers 230 which may be used to transport the optical module carrier 200. In a preferred embodiment, the rollers may be balls (e.g., ball bearings) which partially extend through holes in the bottom surface of the tray 210. Alternatively, the rollers may be wheels, cylindrical rollers, or similar devices mounted to the bottom surface of the tray 210.

In a preferred embodiment, the optical module carrier 200 includes loaders which are spring loaded to provide an additional degree of freedom in the vertical direction. By applying pressure in a downward direction, the springs may be compressed and the vertical position of an optical module mounted on the optical module carrier may be precisely adjusted.

Figure 3A:
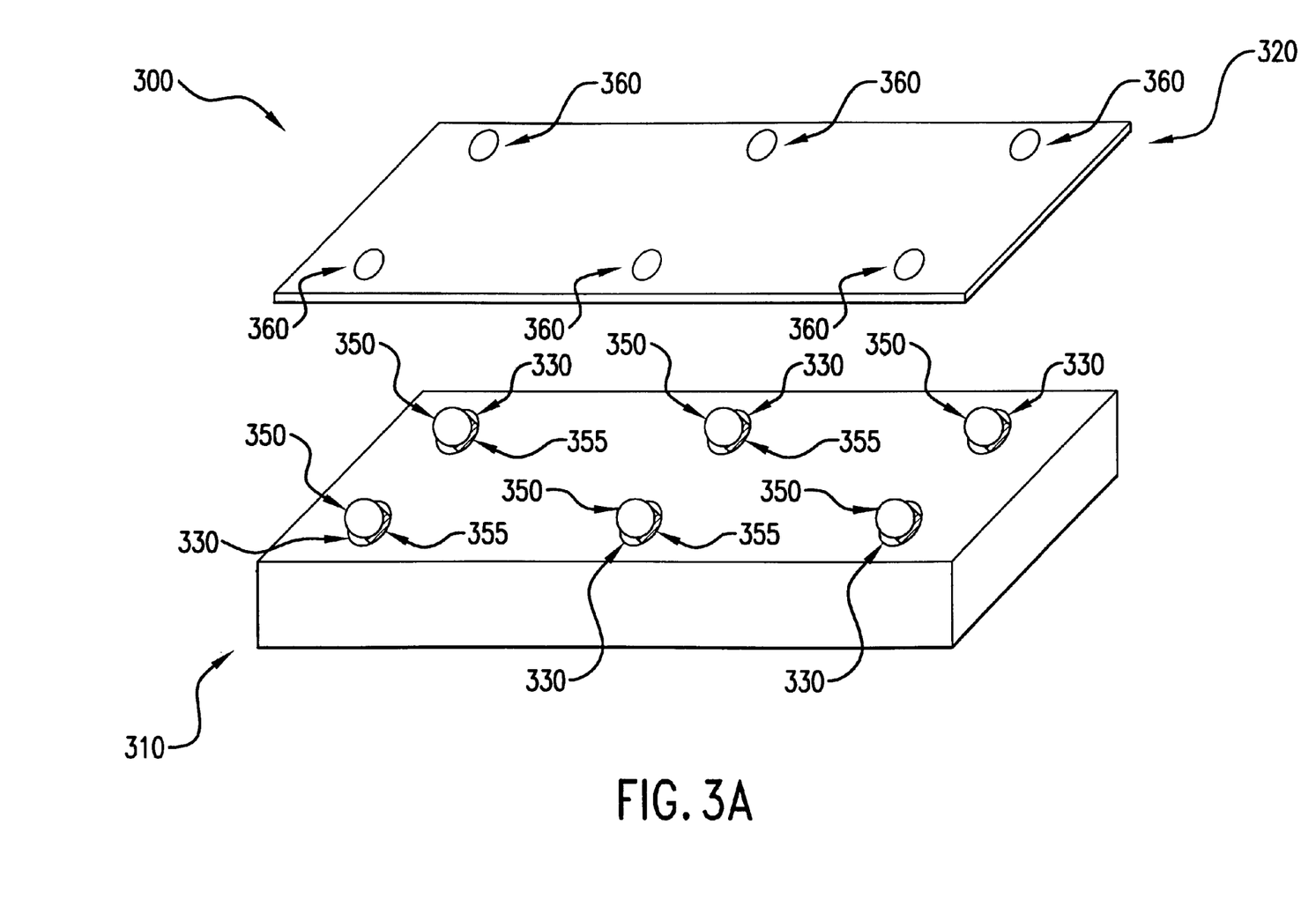
FIG. 3A shows a first embodiment of a tray for an optical module carrier.

FIG. 3A shows a first preferred embodiment of a tray 300 for an optical module carrier. In a preferred embodiment, the tray 300 may consist of a top portion 310 and a bottom cover plate 320 which are attached together. The top portion 310 and the bottom cover plate 320 may snap together, or they may be attached by any convenient means such as by screws, solder joints, welding etc. In a preferred embodiment, the top portion 310 has a plurality of recesses 330 in its bottom surface 340 which may accommodate balls 350. The recesses 330 also may be coated with Teflon or packed with lubricant to help the balls 350 to roll more freely. Corresponding to each recess 330, the bottom cover plate 320 has a hole 360 having a diameter which is slightly smaller than the diameter of the recess 330. The balls 350 are placed in the recesses 330 of the top portion 310 and the bottom cover plate 320 is then attached. Thus the balls 350 extend through the holes 360 a fixed distance below the bottom surface of the tray 300 such that they freely rotate in the holes 360. In this way, the optical module carrier may easily convey an optical module upon a top surface of an optical platform to one or more optical inspection stations while placing each optical device at the same distance above the top surface of the optical platform as the optical interface of the corresponding optical inspection station.

In some cases, the optical inspection stations each may have an optical interface which is a different distance above the top surface of the optical platform. In that case, the optical devices on an module each may need to be placed at different distances above the top surface of the optical platform to be aligned with the optical interface of the corresponding optical inspection station.

In a preferred embodiment, the optical module carrier tray 300 includes a spring 355 for each recess 330 and ball 350. The spring 355 allows the vertical positioning of the tray 300 to be adjusted slightly for precisely aligning an optical module with an optical device interface of an optical module inspection station.

Figure 3B:
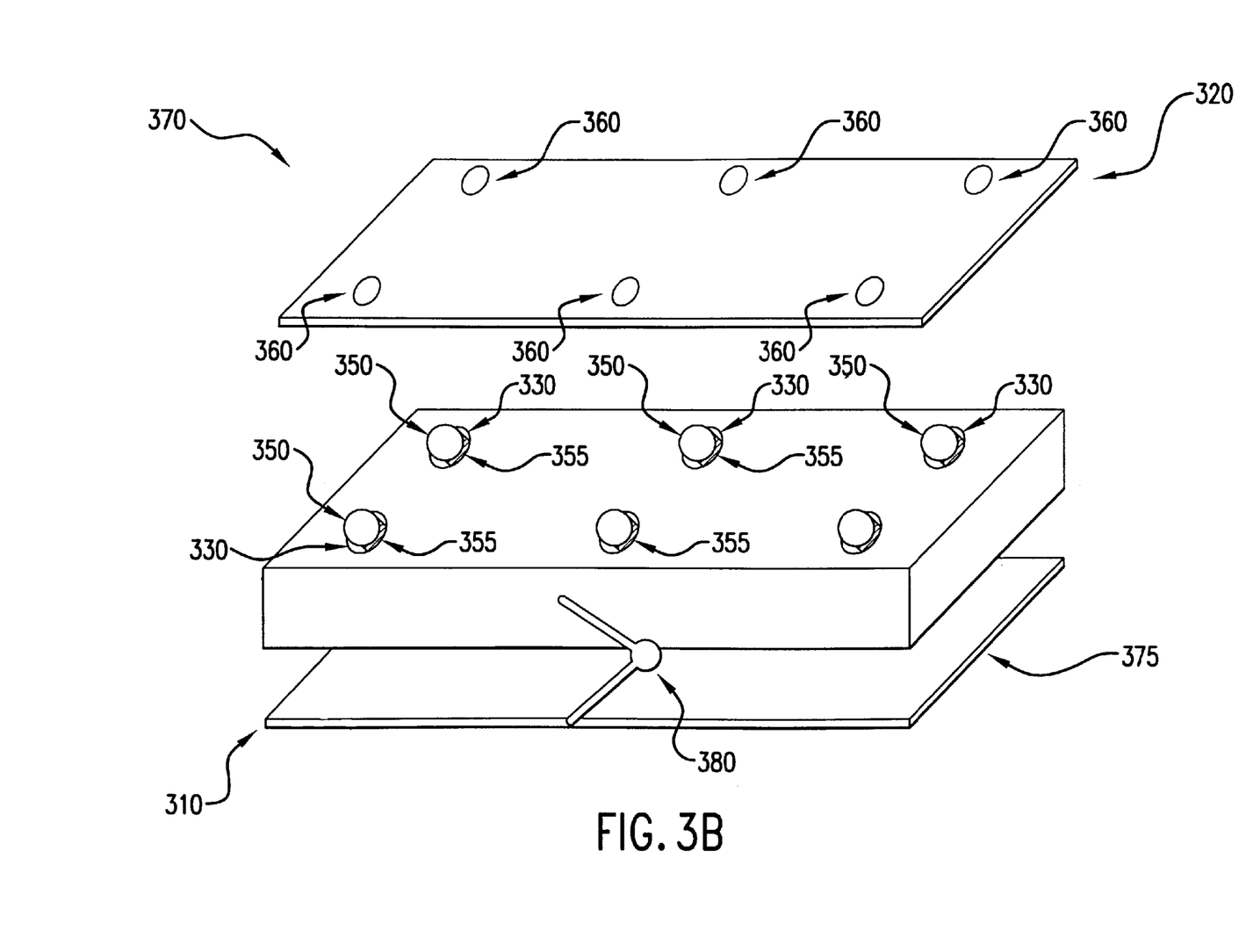
FIG. 3B shows a second embodiment of a tray for an optical module carrier.

FIG. 3B shows a second preferred embodiment of a tray 370 for an optical module carrier which may also accommodate the need to place different optical devices at different heights to align them with the optical device interfaces of corresponding inspection apparatuses. The tray 370 is similar to the tray 300 shown in FIG. 3A except that it includes a top cover 375 and one or more elevation mechanisms 380. The elevation mechanism 380 may be used to raise or lower top cover 375 above the rest of the optical module carrier. In this way, an optical module may be raised or lowered so that each optical device on an optical module may be precisely positioned to match the distance above the top surface of the optical platform as the optical interface of the corresponding optical inspection station. Although FIG. 3B shows a "scissors-type" elevation mechanism, one skilled in the art would recognize that many other elevation mechanisms could be incorporated into the optical module carrier to raise or lower the optical module.

Figure 4:
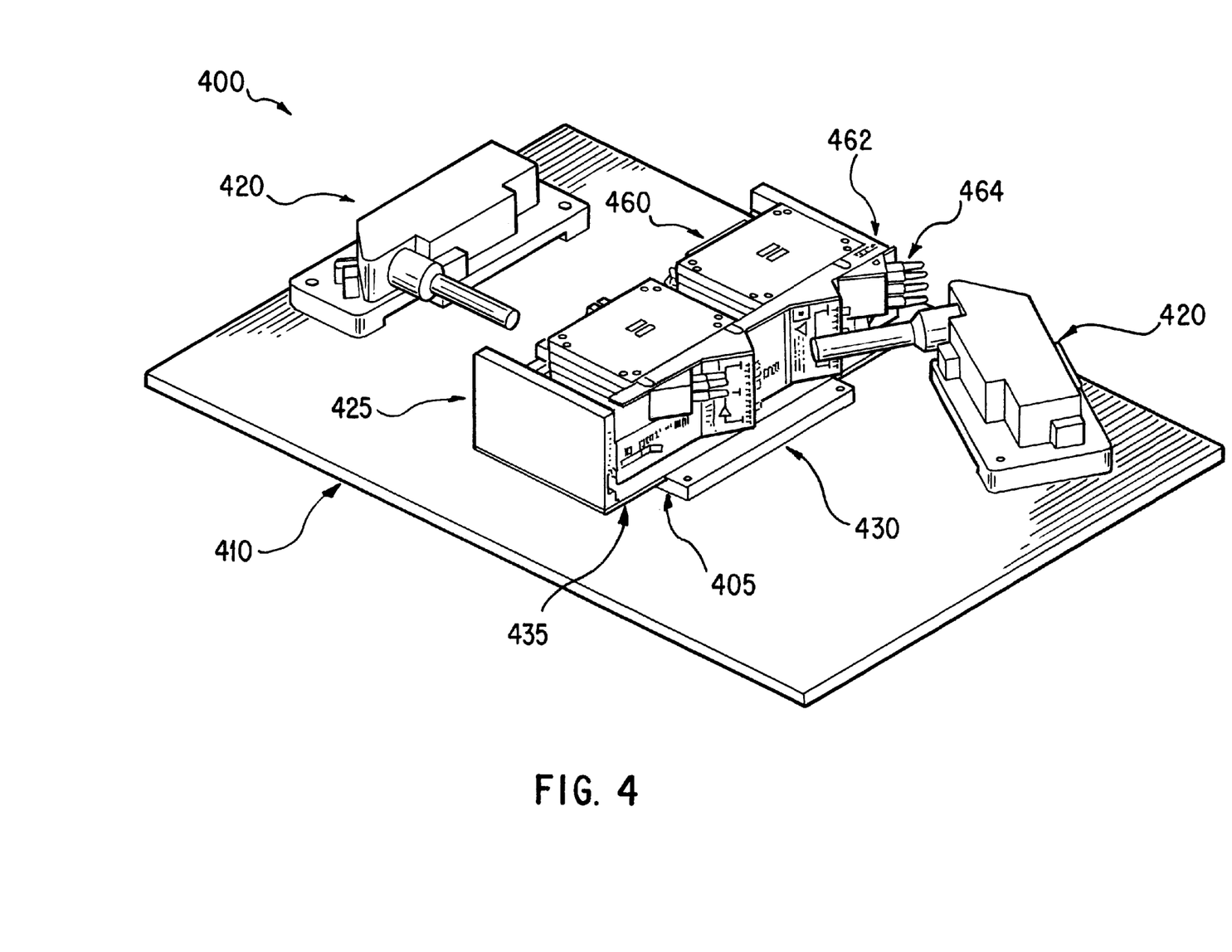
FIG. 4 shows an optical module mounted on an optical module carrier in an optical module inspection circuit.

FIG. 4 shows an optical module inspection circuit 400 with an optical module carrier 405 on an optical platform 410 having two optical inspection stations 420. An optical module 460 is mounted on the optical module carrier 405.

The optical module 460 shown here includes a faceplate 462 and several bulkheads 464 which house optical device surfaces to be inspected at the inspection stations 420. The bulkheads 462 may include an optical connector for interfacing with a microscope or electronic imaging device.

The optical module carrier 405 includes two vertical pillars 425 having slots for holding the optical module 460. The optical module carrier 405 also includes a tray 430 for conveying the optical module 460 along the top surface of the optical platform 410. As shown here, the vertical pillars 425 are attached to the tray 430 by means of a plate 435.

In a preferred embodiment, the optical module carrier 405 may be fabricated of aluminum or another lightweight metal, plastic, or another appropriate material.

As described above, in a preferred embodiment, the tray 430 includes a plurality of rollers such as ball bearings on a bottom surface for smoothly conveying the optical module to an optical inspection station 420. Also, in a preferred embodiment, the top surface of the optical platform 410 is made to have low friction using, for example, a silicone based coating.

Figure 5:
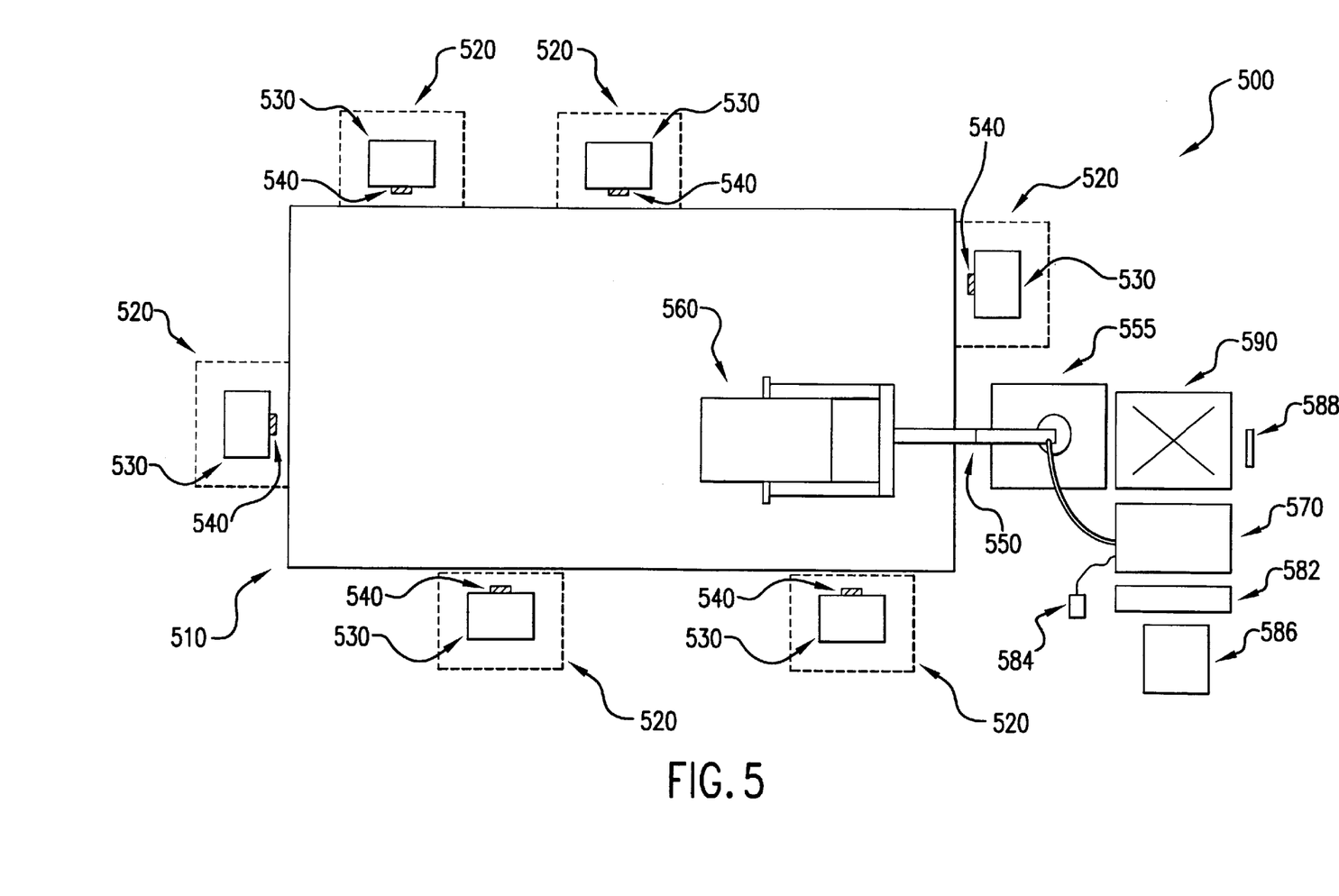
FIG. 5 shows a second embodiment of an optical module inspection circuit.

FIG. 5 shows a preferred embodiment of an automated optical module inspection circuit 500. The optical module inspection circuit 500 includes an optical platform 510 upon which are arranged one or more optical inspection stations 520 at fixed positions. Each optical inspection station 520 includes an optical inspection apparatus 530 having an optical interface 540 located a fixed distance above the top of the optical platform 510.

The optical module inspection circuit 500 also includes a movable arm 550 extendable from a base 555 over the surface of the optical platform 510. In a preferred embodiment, the movable arm 550 is attached to an optical module carrier 560 which conveys an optical module to each optical inspection station 520 in the optical module inspection circuit 500. The optical module carrier 560 is designed to place each optical device on the optical module the same distance above the top surface of the optical platform 510 as the optical interface 540 of the corresponding optical inspection station 520. This insures that the optical device is aligned with the optical inspection apparatus to prevent damage to the optical device.

Preferably, the movable arm 550 is mechanically controlled by one or more signals from a programmable processor 570 to automatically position the optical module at one or more optical inspection stations 520 on the optical platform 510. In that case, the processor 570 executes a program which divides the top surface of the optical platform 510 into an X-Y Cartesian coordinate grid. The X-Y coordinates for the optical interface 540 of each optical inspection station 520 are stored in processor memory, and the processor 570 executes a software program to automatically position the movable arm 550 at the X-Y coordinates for each optical interface in order to inspect an optical device on an optical module.

Preferably, the processor 570 has one or more data entry devices such as a keyboard 582, a mouse 584, a graphics tablet 586 and/or a light pen 588. The processor 570 also has a display device such as a monitor 590.

Preferably, the processor 570 executes a first training routine for storing in memory the X-Y coordinates for each optical interface 540 of the optical inspection stations 520 along the optical platform 510. The movable arm 550 is steered to the proper location for each optical inspection station 520 either manually or under computer control. The arm is positioned so that an optical module on the optical module carrier 560 is properly positioned and oriented to align an optical device with the optical interface 540 for the corresponding optical inspection station 520. Then the corresponding X-Y coordinate of the optical interface 540 is manually or automatically stored into memory by the processor 570. This process is repeated for each optical inspection station 520 in the optical module inspection circuit 500.

The processor 570 also executes a second inspection routine for controlling the movable arm 550 to automatically position an optical device on an optical module to be inspected at the optical interface 540 of the corresponding optical inspection station 520 on the optical platform 510. A user may enter an identification number for an inspection station 520 and the processor 570 retrieves the corresponding X-Y coordinates of the optical interface 540 from memory. The processor 570 then supplies control signals to the movable arm 550 to move it to align the optical device to be inspected with the optical interface 540 for the corresponding optical inspection station 520. This is repeated for each optical device and each inspection station in the optical module inspection circuit 500.

In a variation of the first preferred embodiment of an automated optical module inspection circuit, the movable arm may also move the optical module carrier in the Z dimension above the top surface of the optical platform 510. This may allow the movable arm to automatically place different optical device on an module at different heights above the top surface of the optical platform to align them with corresponding inspection apparatuses.

In that case, during the training routine, the Z coordinate for each optical interface 540 of the optical inspection stations 520 along the optical platform 510 is stored in memory along with the X-Y coordinates. Likewise, during the inspection routine the movable arm 550 automatically positions each optical device on an optical module to be inspected at the proper X, Y and Z coordinates for the optical interface 540 of the corresponding optical inspection station 520 on the optical platform 510.

Figure 6:
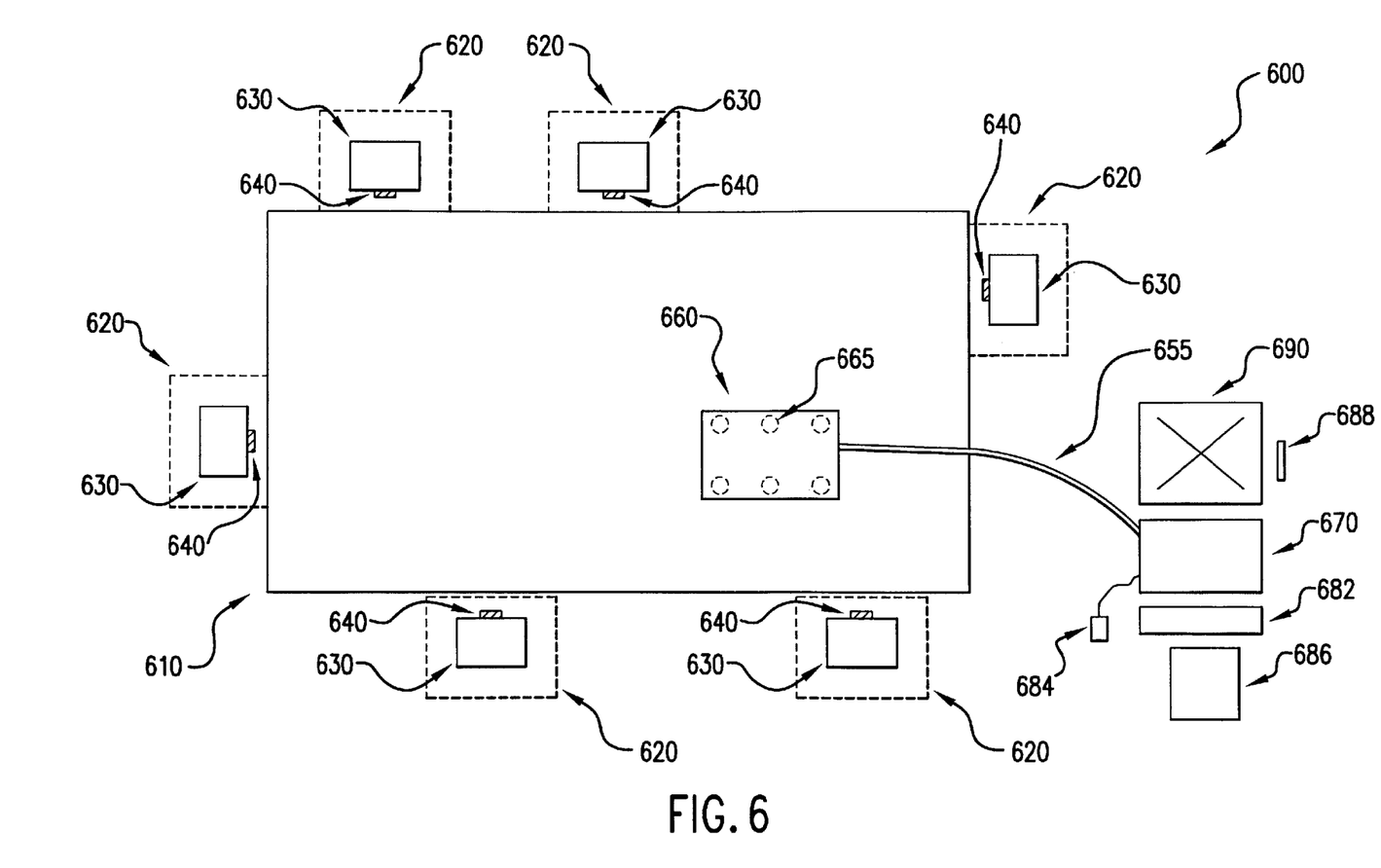
FIG. 6 shows a third embodiment of an optical module inspection circuit.

FIG. 6 shows another preferred embodiment of an automated optical module inspection circuit 600. The optical module inspection circuit 600 includes an optical platform 610 upon which are arranged one or more optical inspection stations 620 at fixed positions. Each optical inspection station 620 includes an optical inspection apparatus 630 having an optical interface 640 located a fixed distance above the top of the optical platform 610.

The optical module inspection circuit 600 also includes an optical module carrier 660 which conveys an optical module to each optical inspection station 620 in the optical module inspection circuit 600. The optical module carrier 660 is designed to place each optical device on the optical module the same distance above the top surface of the optical platform 610 as the optical interface 640 of the corresponding optical inspection station 620. This insures that the optical device is aligned with the optical inspection apparatus to prevent damage to the optical device.

Preferably, the optical module carrier 660 is mechanically controlled by one or more signals from a programmable processor 670 to automatically position the optical module at one or more optical inspection stations 620 on the optical platform 610. Preferably, the optical module carrier 660 includes an electrical motor for turning rolling means 665 which transport the optical module carrier 660. The rolling means 665 may be wheels, cylindrical rollers, similar devices mounted to the bottom surface of the optical module carrier 660.

Preferably, the top surface of the optical platform 610 is divided into an X-Y Cartesian coordinate grid. The X-Y coordinates for the optical interface 640 of each optical inspection station 620 are stored in processor memory, and the processor 670 executes a software program to automatically position the optical module at the X-Y coordinates for each optical interface in order to inspect an optical device on an optical module.

Preferably, the processor 670 has one or more data entry devices such as a keyboard 682, a mouse 684, a graphics tablet 686 and/or a light pen 688. The processor 670 also has a display device such as a monitor 690.

Preferably, the processor 670 executes a first training routine for storing in memory the X-Y coordinates for each optical interface 640 of the optical inspection stations 620 along the optical platform 610. The optical module carrier 660 is steered to the proper location for each optical inspection station 620 either manually or under computer control. The optical module carrier 660 is positioned so that an optical module mounted thereon is properly positioned and oriented to align an optical device with the optical interface 640 for the corresponding optical inspection station 620. Then the corresponding X-Y coordinate of the optical interface 640 is manually or automatically stored into memory by the processor 670. This process is repeated for each optical inspection station 620 in the optical module inspection circuit 600.

The processor 670 also executes a second inspection routine for transporting the optical module carrier 660 to automatically position an optical device on an optical module to be inspected at the optical interface 640 of the corresponding optical inspection station 620 on the optical platform 610. A user may enter an identification number for an inspection station 620 and the processor 670 retrieves the corresponding X-Y coordinates of the optical interface 640 from memory. The processor 670 then supplies control signals to the optical module carrier 660 to move it to align the optical device to be inspected with the optical interface 640 for the corresponding optical inspection station 620. This is repeated for each optical device and each inspection station in the optical module inspection circuit 600.

In a variation of the second preferred embodiment of an automated optical module inspection circuit, the optical module carrier may include automatic means for elevation in the Z dimension above the top surface of the optical platform 610. This may allow the optical module carrier 660, under control of the processor 670, to automatically place different optical device on an module at different heights above the top surface of the optical platform to align them with corresponding inspection apparatuses.

By the above-described system and process, optical devices may be quickly aligned for inspection without risk of damage.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. An apparatus for inspecting an optical device on an optical module, comprising:

an optical platform having a top surface divided into an X-Y Cartesian grid;

an inspection station disposed along a top of said optical platform having an optical device interface located at a predetermined X-Y coordinate along said Cartesian coordinate grid, said optical device interface located a fixed distance above the top surface of said optical platform;

an optical module carrier for holding the optical module, said optical module carrier positioning said optical device at a distance above the optical platform equal to the fixed distance said optical device interface is located above the top surface of the optical platform; and means for automatically conveying the optical module along a top surface of said optical platform to the predetermined X-Y coordinate where said optical interface of said inspection station is located to thereby substantially collocate said optical device and said optical interface of said inspection station in three-dimensional space.

2. The apparatus of claim 1, wherein said means for automatically conveying the optical module comprises a movable arm attached to said optical module carrier.

3. The apparatus of claim 2, wherein said means for automatically conveying the optical module further comprises:

a programmable processor for executing a program for providing control signals to control said movable arm; and memory for storing data identifying said predetermined X-Y coordinate along said Cartesian coordinate grid where said optical interface of said inspection station is located.

4. The apparatus of claim 2, wherein said means for automatically conveying the optical module comprises:

rolling means for transporting said optical module carrier; and an electric motor for turning said rolling means.

5. The apparatus of claim 4, wherein said means for automatically conveying the optical module further comprises:

a programmable processor for executing a program for providing control signals to control said movable arm; and memory for storing data identifying said predetermined X-Y coordinate along said Cartesian coordinate grid where said optical interface of said inspection station is located.

6. A method of inspecting an optical device on an optical module at an optical module test station located on an optical platform having a top surface divided into an X-Y Cartesian coordinate grid, wherein the optical module test station has an optical device interface located at a predetermined X-Y coordinate along the Cartesian coordinate grid and at a fixed distance above the top surface of the optical platform, said method comprising:

securing the optical module to a top surface of an optical module carrier having rolling means for conveyance;

placing the optical module carrier on the top surface of the optical platform;

automatically conveying said optical module to the predetermined X-Y coordinate where said optical device interface is located and positioning said optical device at a distance above the optical platform equal to the fixed distance said optical device interface is located above the top surface of the optical platform to thereby substantially collocate said optical device and said optical interface of said inspection station in three-dimensional space; and inspecting the optical device at the optical module test station.

* * * * *